US007765155B2

(12) United States Patent
Yap (10) Patent No.: US 7,765,155 B2
(45) Date of Patent: Jul. 27, 2010

(54) INVOICE PROCESSING APPROVAL AND STORAGE SYSTEM METHOD AND APPARATUS

(75) Inventor: Wai Y. Yap, Selangor (MY)

(73) Assignee: International Business Machines Corporation, Armonk, NY (US)

( * ) Notice: Subject to any disclaimer, the term of this patent is extended or adjusted under 35 U.S.C. 154(b) by 1491 days.

(21) Appl. No.: 10/387,634

(22) Filed: Mar. 13, 2003

(65) Prior Publication Data

US 2004/0181482 A1 Sep. 16, 2004

(51) Int. Cl.
*G06Q 40/00* (2006.01)
(52) U.S. Cl. ...................................................... 705/40
(58) Field of Classification Search .............. 705/35–45
See application file for complete search history.

(56) References Cited

U.S. PATENT DOCUMENTS

| | | | |
|---|---|---|---|
| 5,930,778 | A | 7/1999 | Geer |
| 6,058,380 | A | 5/2000 | Anderson et al. |
| 6,081,790 | A | 6/2000 | Rosen |
| 6,360,211 | B1 | 3/2002 | Anderson et al. |
| 6,826,542 | B1 * | 11/2004 | Virgin et al. ................... 705/34 |
| 2001/0014880 | A1 | 8/2001 | Beach et al. |
| 2001/0025262 | A1 | 9/2001 | Ahmed |
| 2001/0049615 | A1 | 12/2001 | Wong et al. |
| 2002/0052812 | A1 * | 5/2002 | Braverman ................... 705/34 |
| 2002/0116334 | A1 * | 8/2002 | Bennett et al. ................. 705/40 |
| 2003/0009420 | A1 * | 1/2003 | Jones .......................... 705/39 |
| 2003/0079638 | A1 * | 5/2003 | Burnett ....................... 101/492 |
| 2003/0220863 | A1 * | 11/2003 | Holm et al. ................... 705/37 |

FOREIGN PATENT DOCUMENTS

CA 2317193 8/2000

OTHER PUBLICATIONS

"Standardized Electronic Invoicing for Industry", American Machinist, May 1, 2001.*
"Form Management" by D. Tsichritzis, University of Toronto, copyright 1982.

* cited by examiner

*Primary Examiner*—Thu-Thao Havan
*Assistant Examiner*—Chia-Yi Liu
(74) *Attorney, Agent, or Firm*—Anna L. Linne; Roberts Mlotkowski Safran & Cole, P.C.

(57) ABSTRACT

A front-end electronic data interface system, known as the 'Invoice Processing Approval and Storage System (IPASS), comprises a contractor or buyer's server computer accessible by the internet and adapted for storing an IPASS software which interfaces between a traditional accounts payable system and a subcontractor/supplier entity that generates an invoice. The IPASS System will automatically update the traditional accounts payable system with invoice information when a fax or scan of a subcontractor or supplier invoice is received without the need for manual keying of the invoice information, automatically seek any necessary approvals for payment of the invoice, and automatically record a payment of the invoice. The IPASS System will temporarily store an image of the invoice in an invoice image depository prior to archival storage. As a result, the subcontractor/supplier can seek status of payment of the invoice by accessing the invoice image depository. The subcontractor/supplier can access the invoice image depository by accessing the internet and overcoming a firewall in the IPASS System, the firewall being overcome by supplying a required subcontractor/supplier userid and identifying number.

20 Claims, 3 Drawing Sheets

INVOICE PROCESSING APPROVAL AND STORAGE SYSTEM METHOD AND APPARATUS

BACKGROUND OF THE INVENTION

The subject matter of the present invention relates to an invoice processing approval and storage system adapted to be stored in a memory of a server, operatively connected to a traditional accounts payable system, and responsive to requests received from a subcontractor or supplier via the internet for receiving invoice information, transferring data from the invoice into corresponding fields of the traditional accounts payable system, automatically reminding managers to approve or disapprove payment of the invoice, automatically indicating that the invoice was approved or disapproved or paid, and storing the invoice into an image archival database.

In some countries where an electronic data interface is not an acceptable means for exchanging information between a first business and a second business during the processing of payables, hardcopy information (such as a hardcopy invoice) is generated by a first business (such as a subcontractor or a supplier) and that hardcopy information is subsequently received by a second business (such as a contractor or buyer). When the hardcopy information is received, the second business must reconvert the data appearing on the hardcopy information into electronic digital information for storage into a traditional accounts payable system database so that the electronic digital information may subsequently undergo further processing, such as review/approval, matching with a purchase order, and sending payment from the contractor or buyer to the subcontractor or supplier.

In the absence of an electronic data interface front end system, when a hardcopy invoice is received, manual work is required to enter a plurality of data from the hardcopy invoice into a database, and this manual work is repeated several times in various organizations thereby generating one or more typographical errors which are stored along with other entered data in the database. In addition, after the plurality of data has been entered into the database, it is necessary to manually track the hardcopy invoices throughout the entire approval process. Furthermore, certain necessary information in the database must be updated periodically (approved, not approved, paid, or not paid) in order to complete the processing of the hardcopy invoices. Finally, the hardcopy invoices must be stored for future reference. In the absence of an electronic data interface front-end system, the user must implement the following process: (1) scan-in a plurality of images associated with a supplier invoice, (2) send the plurality of images via a data network from one location to another, (3) print in hardcopy form the received plurality of images associated with the supplier invoice (hereinafter, 'hardcopy supplier invoice'), and, since the plurality of images on the hardcopy supplier invoice include a plurality of data, (4) manually key the plurality of data into a traditional accounts payable system, such as the Common Alternative Accounts Payable System (CAAPS) used by the International Business Machines Corporation. Meanwhile, the hardcopy supplier invoice is circulated in its country of origin to obtain the necessary approvals and the hardcopy supplier invoice is then filed away for future reference. The disadvantages associated with the aforementioned process, which is implemented by the user in the absence of an electronic data interface front-end system, are: (1) the high costs incurred for scanning-in the plurality of images associated with the supplier invoice, (2) the manual tracking and manual updating of information into the traditional accounts payable system is not avoided, (3) the same problems associated with manually updating information and manually reviewing and approving of supplier invoices, such as typographical errors and documents lost in transit and manually tracking and obtaining approvals, are not avoided; (4) increased data network load requirement, and (5) security protection of information on the hardcopy supplier invoices can be compromised.

Accordingly, a front-end electronic data interface is needed (otherwise known as an Invoice Processing Approval and Storage System or IPASS System), which is adapted to interface between the aforementioned traditional accounts payable system and the subcontractor or supplier that generates the invoice, for automatically updating the traditional accounts payable system when a fax or scan of a subcontractor or supplier invoice is received without the need for manually keying of invoice information, automatically seeking any necessary approvals for payment of the invoice, and automatically recording a payment of the invoice.

SUMMARY OF THE INVENTION

A front-end electronic data interface system, known as the 'Invoice Processing Approval and Storage System (IPASS), comprises a contractor or buyer's server computer accessible by the internet and adapted for storing a novel IPASS software which interfaces between a traditional accounts payable system and a subcontractor/supplier entity that generates an invoice. The IPASS System will automatically update the traditional accounts payable system with invoice information when a fax or scan of a subcontractor or supplier invoice is received without the need for manual keying of the invoice information, automatically seek any necessary approvals for payment of the invoice, and automatically record a payment of the invoice. The IPASS System will temporarily store an image of the invoice in an invoice image depository prior to archival storage. As a result, the subcontractor or supplier can seek status of payment of the invoice by accessing the invoice image depository. The subcontractor/supplier can access the invoice image depository by accessing the internet and overcoming a firewall in the IPASS System, the firewall being overcome by supplying a required subcontractor/supplier userid and identifying number.

The Invoice Processing Approval and Storage System (IPASS System) includes a server computer, representing a contractor or buyer's computer, which is adapted to interface between a traditional accounts payable system [namely, the 'Common Alternative Accounts Payable System (CAAPS)' or 'CAAPS accounts payable system'] and a subcontractor or supplier that generates an invoice. The server computer stores an Invoice Processing Approval and Storage System software (IPASS software). The server computer is accessible via the Internet by the subcontractor/supplier, however, a firewall must be overcome before the general public can access the server computer. A subcontractor or supplier would fax a paper invoice to the server computer representing the contractor's or buyer's computer. The IPASS software includes an Invoice Front-end Processing (IFP) unit. The IFP unit will receive an image associated with the fax transmission of the paper invoice. That is, the IFP unit of the IPASS software stored in the server computer, in conjunction with a processor of the server computer, will receive the image associated with the fax transmission of the paper invoice of the subcontractor or supplier (or internal scan of the paper invoice) and, responsive thereto, the IFP unit of the IPASS software will: store the image associated with the fax transmission on the processor of the server computer, convert the stored fax transmission of the paper invoice into a digitized image which includes a plurality of data characters stored in selected locations, read the data characters in the selected locations from the digitized image using optical character recognition technology, and transfer the read data characters into corresponding data fields of the CAAPS accounts payable system. At this point, the CAAPS accounts payable system stores the data characters from the paper invoice in corresponding fields of the CAAPS system. The CAAPS system now stores all information concerning the paper invoice in its internal database (which is called the 'Automated CAAPS Update'). The IFP unit will now pass the image associated with the fax transmission of the paper invoice to an 'invoice image depository' contained in a content management database. When a buyer receives the goods previously ordered as stated on the invoice or when a contractor receives the services previously ordered as stated on the invoice, during a CAAPS 'automated approval process' routine, the buyer's or contractor's manager responsible for the goods or services previously ordered will be automatically reminded, by the CAAPS system during the 'automated approval process' routine, to either approve or disapprove the invoice. This automatic reminder will take place via a link to the manager's Lotus Notes wherein the CAAPS 'automated approval process' will initiate or stimulate the manager's Lotus Notes which requires the manager's Lotus Notes to automatically remind the manager of his obligation to either approve or disapprove the invoice. When the manager approves or disapproves of the invoice, the CAAPS 'automated approval process' routine will automatically record the approval/disapproval of the invoice: on the image (associated with the fax transmission of the paper invoice) which is stored in the invoice image depository of the content management database. When the manager approves the invoice, a bank check will be issued to the subcontractor/supplier, and a CAAPS 'bank paylink' routine will automatically record the issuance of the check: on the image (associated with the fax transmission of the paper invoice) which is stored in the invoice image depository of the content management database. The image (associated with the fax transmission of the paper invoice) which is stored in the invoice image depository of the content management database will now be moved for storage in an 'invoice image archival database' in the content management database. In the meantime, at any time, the subcontractor or supplier can access the invoice image depository in the content management database, via the subcontractor/supplier's computer and the internet, for the purpose of determining the latest status of payment of their invoice, provided that the subcontractor or supplier can overcome the firewall in the contractor/buyer's server computer. In order to overcome that firewall, the subcontractor/supplier must provide the subcontractor/supplier's unique 'userid' and 'number' which uniquely identifies the subcontractor or supplier.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DETAILED DESCRIPTION OF THE PREFERRED EMBODIMENT

Figure 1:
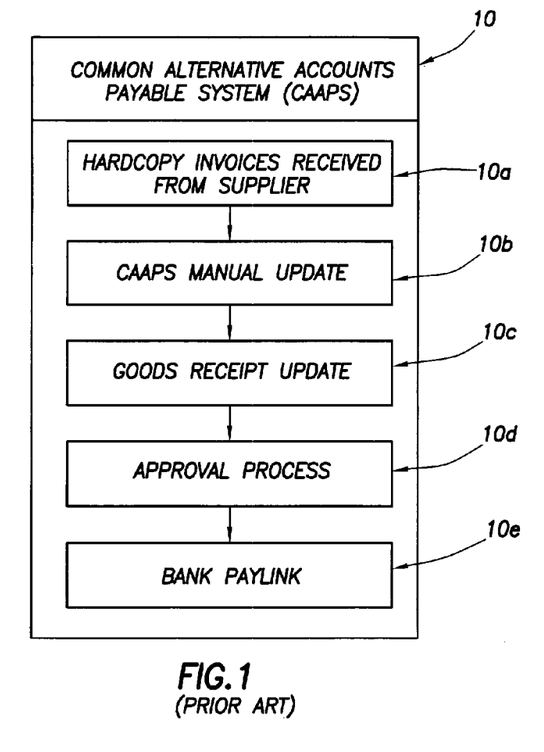
FIG. 1 illustrates a traditional CAAPS accounts payable system of the prior art.

Referring to FIG. 1, a prior art traditional accounts payable system 10 is illustrated, the traditional accounts payable system 10 being hereinafter known as the 'Common Alternative Accounts Payable System (CAAPS)' 10 or CAAPS system 10. The CAAPS system 10 is utilized by the International Business Machines Corporation of Armonk, N.Y. When a hardcopy invoice is received by the CAAPS system 10 from a supplier (or subcontractor), block 10*a* in FIG. 1, the first step practiced by the CAAPS system is to manually update the CAAPS system database; see the 'CAAPS Manual Update' block 10*b* in FIG. 1. As noted earlier, there are several problems associated with manually updating the CAAPS system database as illustrated in block 10*b* of FIG. 1. That is, manual work is required to enter a plurality of data from a hardcopy invoice into the CAAPS system database, and this manual work is repeated several times in various organizations thereby generating one or more typographical errors which are stored along with other entered data in the database. The next step practiced by the CAAPS system is to update the receipt of goods portion of the CAAPS system database when a set of goods previously ordered by a buyer has been received; see the 'Goods Receipt Update' block 10*c* in FIG. 1. The next step practiced by the CAAPS system is the 'approval process' wherein, when the goods previously ordered have been received by a buyer, the invoice must be either approved or disapproved by the buyer; see the 'Approval Process' block 10*d* in FIG. 1. The next step practiced by the CAAPS system is the payment or nonpayment of the invoice after the buyer has either approved or disapproved the invoice; see the 'Bank Paylink' block 10*e* in FIG. 1. However, as noted earlier, there are several additional problems associated with these additional steps 10*c*, 10*d*, and 10*e*. That is, after the plurality of data has been entered into the database, it is necessary to manually track the hardcopy invoices throughout the entire approval process. Furthermore, certain necessary information in the database must be updated periodically (approved, not approved, paid, or not paid) in order to complete the processing of the hardcopy invoices. Finally, the hardcopy invoices must be stored for future reference. In the absence of an electronic data interface front-end system, the user must implement the following process: (1) scan-in a plurality of images associated with a supplier invoice, (2) send the plurality of images via a data network from one location to another, (3) print in hardcopy form the received plurality of images associated with the supplier invoice (hereinafter, 'hardcopy supplier invoice'), and, since the plurality of images on the hardcopy supplier invoice include a plurality of data, (4) manually key the plurality of data into the CAAPS system 10. Meanwhile, the hardcopy supplier invoice is circulated in its country of origin to obtain the necessary approvals and the hardcopy supplier invoice is then filed away for future reference. The disadvantages associated with the aforementioned process, which is implemented by the user in the absence of an electronic data interface front-end system, are: (1) the high costs incurred for scanning-in the plurality of images associated with the supplier invoice, (2) the manual tracking and manual updating of information into the traditional accounts payable system is not avoided, (3) the same problems associated with manually updating information and manually reviewing and approving of supplier invoices, such as typographical errors and documents lost in transit and manually tracking and obtaining approvals, are not avoided; (4) increased data network load requirement, and (5) security protection of information on the hardcopy supplier invoices can be compromised.

Figure 2:
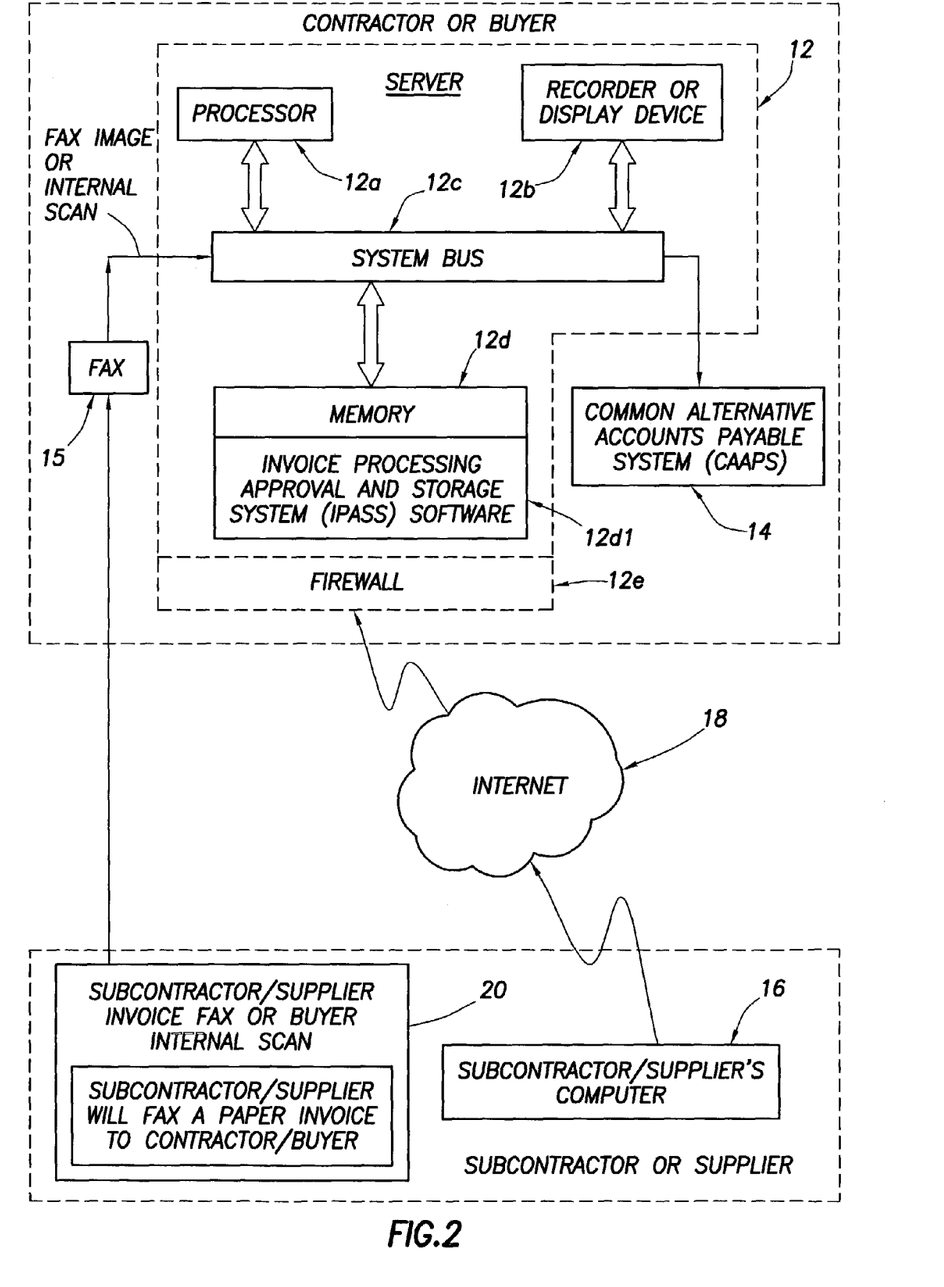
FIG. 2 illustrates a front-end electronic data interface system known as the 'Invoice Processing Approval and Storage System (IPASS)' or 'IPASS System' which interfaces between the traditional CAAPS accounts payable system and a subcontractor/supplier entity that generates an invoice.

Referring to FIG. 2, a front-end electronic data interface system in accordance with the present invention, known as the 'Invoice Processing Approval and Storage System (IPASS)' or 'IPASS System', which interfaces between the traditional CAAPS accounts payable system and a subcontractor/supplier entity that generates an invoice, is illustrated.

In FIG. 2, a contractor or buyer's computer 12, also known as the contractor or buyer's server 12, interfaces between a Common Alternative Accounts Payable System (CAAPS) 14 and a subcontractor or supplier's computer 16. The subcontractor or supplier's computer 16 may be a personal computer (PC), a workstation, or a mainframe. Examples of possible workstations include a Silicon Graphics Indigo 2 workstation or a Sun SPARC workstation. The contractor or buyer's server 12 would include a processor 12a connected to a system bus 12c, a recorder or display device 12b connected to the system bus 12c, and a memory 12d connected to the system bus 12c. The memory 12d stores a novel 'Invoice Processing Approval and Storage System' software 12d in accordance with one aspect of the present invention. The memory 12d is a computer readable medium or a program storage device which is readable by a machine, such as the processor 12a. The processor 12a may be, for example, a microprocessor, microcontroller, or a mainframe or workstation processor. The memory 12d, which stores the 'Invoice Processing Approval and Storage System' software 12d, may be, for example, a hard disk, ROM, CD-ROM, DRAM, or other RAM, flash memory, magnetic storage, optical storage, registers, or other volatile and/or non-volatile memory. In order to determine a status for payment of a particular invoice, a subcontractor or supplier can use the subcontractor or supplier's computer 16 of FIG. 2 to access the internet 18 and to ultimately access a firewall 12e of the contractor or buyer's server 12. In order to overcome the firewall 12e, the subcontractor or supplier must key a suitable 'userid' and 'number' into their computer 16 for identifying the subcontractor or supplier. When the subcontractor/supplier is ready to send an invoice to the contractor/buyer, the subcontractor/supplier will fax a paper invoice, illustrated in block 20, to a dedicated fax machine 15 of the contractor/buyer and, responsive thereto, either a 'fax image' or an 'internal scan' of that paper invoice will be provided as 'input data' to the contractor/buyer's server 12. See blocks 15 and 20 of FIG. 2. Alternatively, when the contractor or buyer receives the fax of that paper invoice from fax machine 15 or a supplier invoice from postal mail, the buyer may choose to internally scan that paper invoice thereby producing an internal scanned image of that paper invoice, and that internal scanned image of the paper invoice may be provided as 'input data' to the contractor/buyer's server 12.

Figure 3:
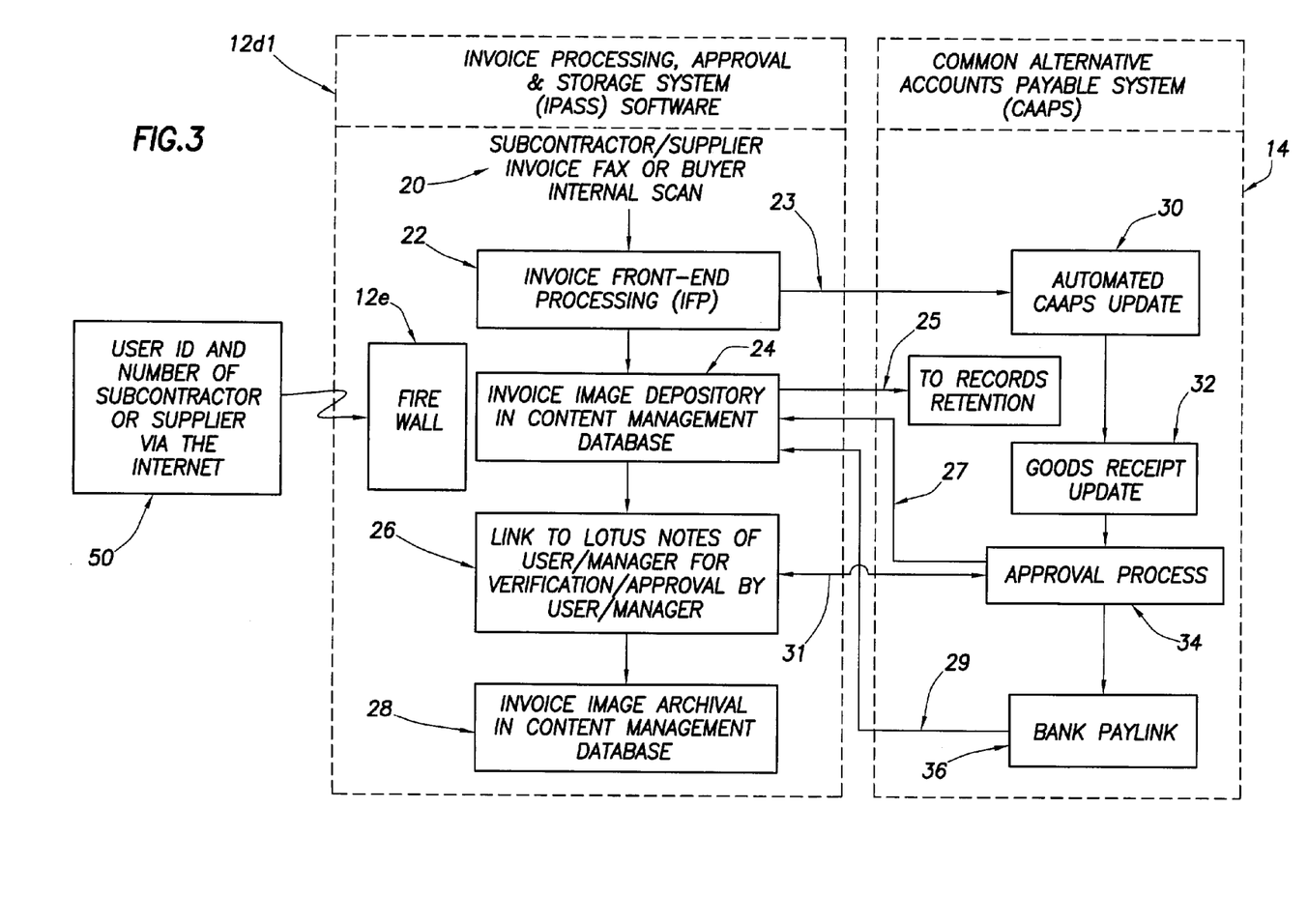
FIG. 3 illustrates a more detailed construction of the Invoice Processing Approval and Storage System (IPASS) System and a more detailed construction of the traditional CAAPS accounts payable system, the IPASS System being shown interfacing with the CAAPS accounts payable system.

Referring to FIG. 3, a more detailed construction of the Invoice Processing Approval and Storage System (IPASS) software 12d1 of FIG. 2 of the present invention, and a more detailed construction of the Common Alternative Accounts Payable System (CAAPS) 14 of FIG. 2 is illustrated. In FIG. 3, the IPASS software 12d1 is shown interfacing with and operatively connected to the Common Alternative Accounts Payable System (CAAPS) 14 of FIG. 2.

In FIG. 3, the IPASS software 12d1 receives the subcontractor/supplier invoice fax or buyer internal scan 20 of FIG. 2. Recall that, when the subcontractor/supplier is ready to send an invoice to the contractor/buyer, the subcontractor/supplier will fax a paper invoice to the contractor/buyer, and the contractor/buyer will receive a 'fax image of the paper invoice'. Alternatively, upon receiving the 'fax image of the paper invoice' or a supplier invoice from postal mail, the contractor or buyer can then 'scan-in' the 'fax image of the paper invoice' thereby generating an 'internal scan of the paper invoice'. The 'internal scan of the paper invoice' or the 'fax image of the paper invoice' can be provided as input data to the server 12 of FIG. 2 and to the IPASS software 12d1 of FIG. 3.

In FIG. 3, the IPASS software 12d1 includes four major sub-blocks: (1) an 'Invoice Front-end Processing (IFP)' unit, block 22, which will transfer data characters, read from a fax image of internal scan image of an invoice, into corresponding data fields of the CAAPS accounts payable system 14 via line 23 in FIG. 3; (2) an 'Invoice Image Depository in a Content Management Database', block 24, which (2a) is responsive to the 'userid' and the 'number' of the subcontractor/supplier, block 50, that has been generated by the subcontractor/supplier's computer 16 via the internet 18 in order to overcome the firewall 12e, (2b) will transfer the fax image or internal scan image of the incoming invoice from the IFP unit 22 to records retention via line 25 in FIG. 3, (2c) will respond to a the 'approval process' portion of the CAAPS accounts payable system 14 via line 27 in FIG. 3 to record a manager's approval of the invoice, and (2d) will respond to the 'bank paylink' portion of the CAAPS accounts payable system 14 via line 29 in FIG. 3 to record the payment of the invoice; (3) a 'Link to the Lotus Notes of a User/Manager for Verification/Approval by the User/Manager', block 26, which will communicate with the 'approval process' portion of the CAAPS accounts payable system 14 via line 31 of FIG. 3 to remind a User/Manager to approve the payment of the invoice, and (4) 'Invoice Image Archival in the Content Management Database', block 28.

In FIG. 3, the Common Alternative Accounts Payable System (CAAPS) 14 includes four major sub-blocks: (1) an Automated CAAPS Update, block 30, representing a 'CAAPS information database' responsive to updated data and information received from the Invoice Front-end Processing (IFP) unit 22 of the IPASS software 12d, (2) a Goods Receipt Update, block 32, responsive to the updated data and information stored in the 'CAAPS information database', (3) an Approval Process, block 34, which obtains the necessary approvals from the contractor or buyer's manager prior to payment of the invoice, and (4) a Bank Paylink, block 36, which issues a check for payment of the invoice when the necessary approvals from the contractor or buyer's manager is obtained during the Approval Process of block 34.

Figure 4:
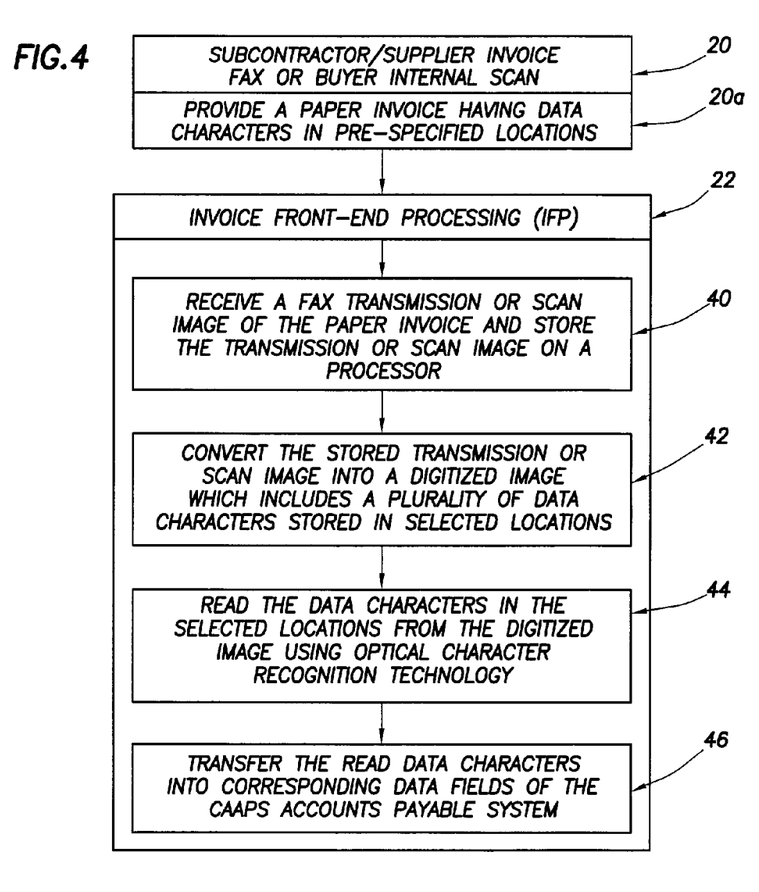
FIG. 4 illustrates a more detailed construction of the Invoice Front-end Processing (IFP) unit which forms a part of the IPASS System of FIG. 3.

Referring to FIG. 4, a more detailed construction of the Invoice Front-end Processing (IFP) unit 22 of FIG. 3 is illustrated.

In FIG. 4, as noted earlier, the IFP unit 22 receives the subcontractor/supplier's invoice or buyer's internal scan 20. In connection with the subcontractor/supplier's invoice or buyer's internal scan 20, the subcontractor/supplier will provide a paper invoice which includes a plurality of data characters, each of the data characters on the paper invoice being located in pre-specified locations, block 20a of FIG. 4. The IFP unit 22 includes the following four major sub-blocks: (1) receive a fax transmission or scan image of the paper invoice and store the transmission or scan image on a processor, block 40 of FIG. 4, (2) convert the stored transmission or scan image into a digitized image which includes a plurality of data characters stored in selected locations, block 42 of FIG. 4, (3) read the data characters in the selected locations from the digitized image using optical character recognition technology, block 44 of FIG. 4, and (4) transfer the read data characters into corresponding data fields of the CAAPS accounts payable system, block 46 of FIG. 4.

A functional description of the operation of the IFP unit 22 of FIG. 3, including the 'subcontractor or supplier invoice fax or buyer internal scan' 20, the IFP unit 22, and the output line 23 of FIG. 3, will be set forth in the following paragraph with reference to FIGS. 2, 3 and 4 of the drawings.

In FIGS. 2 and 3, the input to the IFP unit 22 is comprised of one or more fax images stored in a fax server 15 of FIG. 2. On a periodic basis, the fax images received and stored in the fax server 15 are: captured and imported into the IFP unit server 12, converted into a file format that is recognized by the IFP module 22, and stored in a temporary database in the processor 12a. The converted image stored in the temporary database is then matched with a predefined series of form formats stored therein (i.e., a series of user defined formats for incoming fax images). Once a match is found between the incoming fax image and a stored form format, as illustrated in FIG. 4, certain designated fax information contained in the 'fax image format' is then converted into 'digital data/information' (e.g. invoice number, amount, etc) and one or more 'stored updated images' of the 'digital data/information' are stored back in a batch in the temporary database of the processor 12a. A user can now retrieve the 'stored updated images' in the temporary database to verify that all of the information previously converted from a 'fax image format' into 'digital data/information' has been correctly converted. That is, when certain 'particular information' on the 'stored updated images' of the 'digital/data information' in the temporary database is compared with its corresponding incoming hardcopy fax, and when it becomes apparent that the 'particular information' on the 'stored updated images' of the 'digital/data information' is incorrect, it may be necessary to manually correct or update that 'particular information' thereby creating 'updated digital/data information'. If and when the 'particular information' on the 'stored updated images' in the temporary database has been manually corrected or updated, the resultant 'updated digital/data information' is then re-stored in two forms: (1) as a 'data file' in the CAAPS accounts payable system 14 of FIG. 3 containing the 'updated digital/data information' (see the 'automated CAAPS update' block 30 of FIG. 3 and the 'approval process' block 34 of FIG. 3), that 'data file' being linked to the Lotus notes of a reviewer or approver (see 'link to lotus notes.' 26 of FIG. 3) for the purpose of generating a reminder to that reviewer or approver to approve the invoices received, and (2) as one or more digital images stored in the 'invoice image depository' 24 of FIG. 3 for purposes of retrieval by a user when the user overcomes the firewall 12e and accesses the 'invoice image depository' 24. The processed fax images will then be purged from the temporary database of the processor 12a. This process is repeated on a periodic basis until all received fax images have been processed.

A detailed functional description of the operation of the IPASS software 12d1 of FIG. 3 in conjunction with the Common Alternative Accounts Payable System (CAAPS) 14 of FIG. 3 is set forth in the following paragraphs with reference to FIGS. 1 through 4 of the drawings.

In FIG. 2, assume that a subcontractor has performed his required services as instructed by the contractor or a supplier has supplied one or more his products previously ordered by the buyer. At this point, the subcontractor or supplier is ready to submit an invoice to the contractor or buyer for the services performed or the products supplied. The subcontractor/supplier will fax a hard copy or paper invoice to the contractor buyer, as illustrated in block 20 of FIG. 2. The paper invoice will be faxed by the subcontractor or supplier to a dedicated telephone number used by the contractor or buyer for receiving such invoices. When the subcontractor/supplier invoice is faxed to the contractor/buyer as noted in block 20 of FIG. 2, a fax image of the invoice will be received by the system bus 12c of the contractor/buyer's server 12 of FIG. 2. At this point, the processor 12a of the contractor/buyer's server 12 of FIG. 2 will start to execute the 'Invoice Processing Approval and Storage System (IPASS) software 12d1 of FIG. 2. During that execution of the IPASS software 12d1 by the processor 12a of the server 12 of FIG. 2, a functional interaction will take place between the IPASS software 12d1 and the Common Alternative Accounts Payable System (CAAPS) 14 of FIG. 2. Recall that the CAAPS accounts payable system 14 is a traditional accounts payable system utilized by the International Business Machines Corporation of Armonk, N.Y. The aforementioned functional interaction between the IPASS software 12d1 and the CAAPS accounts payable system 14, during the execution of the IPASS software 12d by the processor 12a of the server 12 of FIG. 2, will be discussed in detail in the following paragraph.

In FIG. 3, recall that the subcontractor/supplier will fax a hard copy or paper invoice to the contractor buyer, as illustrated in block 20 of FIG. 2, and a 'fax image' of the invoice will be received by the system bus 12c of the contractor/buyer's server 12 of FIG. 2. When the contractor or buyer receives the 'fax image' of the invoice, the contractor or buyer may internally 'scan-in' the 'fax image' of the invoice thereby producing an 'internal scan' of the invoice. In FIG. 3, the 'fax image' or 'internal scan' of the invoice, as illustrated by numeral 20 in FIG. 3, is received by the IPASS software 12d1 of FIG. 3 and by the Invoice Front-end Processing (IFP) unit 22 of the IPASS software 12d1 of FIG. 3.

In FIG. 4, when the 'fax image' or 'internal scan' of the invoice, as illustrated by numeral 20 in FIGS. 3 and 4, is received by the IPASS software 12d1 of server 12 of FIG. 3, the subcontractor/supplier is, in fact, providing a paper invoice to the contractor or buyer, the paper invoice including data characters that are placed in pre-specified locations on the invoice, as illustrated by block 20a in FIG. 4. Therefore, when the Invoice Front-end Processing (IFP) unit 22 of FIG. 3 receives that 'fax image' or 'internal scan' of the invoice, the IFP unit 22 will store the 'fax image' transmission or the 'internal scan' image in a cache memory of the processor 12a of the server 12 of FIG. 2, as illustrated by block 40 in FIG. 4. Then, the processor 12a will convert the stored fax image transmission or the internal can image into a 'digitized image' which includes a 'plurality of data characters stored in selected locations', as illustrated by block 42 in FIG. 4, the 'digitized image' being restored in the cache memory of the processor 12a. Then, the processor 12a will re-access its cache memory and read the 'digitized image' stored therein, and, in particular, the processor 12a will read the 'plurality of data characters stored in selected locations' of the 'digitized image', as illustrated in block 44 of FIG. 4. Then, the processor 12a will transfer the 'plurality of data characters stored in selected locations' of the 'digitized image' into corresponding data fields of the CAAPS accounts payable system 14 of FIG. 3, as illustrated in block 46 of FIG. 4.

In FIG. 3, when the processor 12a of server 12 of FIG. 2 transfers a 'plurality of data characters', that are stored in selected locations of the 'digitized image' of the received invoice, into corresponding a 'plurality of data fields' of the CAAPS accounts payable system 14 of FIG. 3, the 'Automated CAAPS Update' block 30 of the CAAPS accounts payable system 14 in FIG. 3 will automatically update all of the 'plurality of data fields' of the CAAPS accounts payable system 14 which correspond, respectively, to the 'plurality of data characters' of the 'digitized image' that have been received from the IFP unit 22 of FIG. 3. Now that the 'plurality of data fields' of the contractor or buyer's CAAPS accounts payable system 14 have been updated with data corresponding to the received invoice, it is necessary to wait for any goods which have been ordered to be received before the invoice can be approved for payment, as illustrated by the 'goods receipt update' block 32 of FIG. 3.

In the meantime, recalling that the IFP unit 22 of FIG. 3 contains the 'fax transmission or the scan image of the received invoice' as illustrated by block 40 of FIG. 4, the IFP unit 22 of FIG. 3 will now transfer the 'fax transmission or scan image of the received invoice' to the 'invoice image depository' portion of a content management database, as illustrated by block 24 of FIG. 3. In addition, the 'fax transmission or scan image of the received invoice' which is stored in the 'invoice image depository' 24 will also be linked to the 'Lotus Notes of a User/Manager', as illustrated by block 26 of FIG. 3. The User/Manager will check his Lotus Notes, periodically, in much the same way that one would check his or her email for any further information.

In FIG. 2, assume now that the subcontractor or supplier wants to check on the status of payment of his/her invoice. Recall that the 'fax transmission or scan image of the received invoice' is stored in the 'invoice image depository' 24, and note that the 'fax transmission or scan image of the received invoice' could now be transferred from the 'invoice image depository' 24 to 'records retention' via line 25 of FIG. 3 for storage therein of the received invoice. Since the subcontractor or supplier wants to check on the status of payment of his or her invoice, it is necessary to use the subcontractor/supplier's computer 16 of FIG. 2 to access the internet 18. When the internet 18 is accessed, the subcontractor or supplier, using their computer 16, will confront a firewall 12e of the contractor or buyer's server computer 12 of FIG. 2. The subcontractor or supplier must now overcome that firewall 12e.

In FIG. 3, in order to overcome that firewall 12e, the subcontractor or supplier must now supply his or her 'userid' and 'number' which uniquely identifies the particular subcontractor or supplier, as illustrated by block 50 of FIG. 3. When the proper 'userid' and the 'number' of block 50 is supplied by the subcontractor or supplier via the internet 18, the firewall 12e of FIG. 3 has been overcome and therefore the subcontractor or supplier can now view the 'fax transmission or scan image of the received invoice' which is stored in the 'invoice image depository' 24. However, at this point, the 'proper approvals' for payment of the invoice, via the 'approval process' block 34, and the 'payment of the invoice', via the 'bank paylink' block 36, have not yet been obtained since we are still awaiting receipt of the ordered goods, via the 'goods receipt update' block 32 of FIG. 3. Therefore, the 'fax transmission or scan image of the received invoice', being viewed by the subcontractor or supplier on the computer 16 via the internet 18, will not yet reflect the 'proper approvals' and the 'payment of the invoice'.

In FIG. 3, assume now that the ordered goods (previously ordered by the buyer) have been received by the buyer and, as a result, the 'goods receipt update' block 32 of FIG. 3 now indicates that the previously ordered goods have now been received by the buyer. At this point, the 'approval process' in block 34 of FIG. 3 will now begin. In FIG. 3, the 'approval process' 34 portion of the CAAPS accounts payable system 14 will now initiate a link, via line 31 in FIG. 3, to the Lotus Notes of a User/Manager associated with the contractor or the buyer for the purpose of reminding the contractor or buyer's User/Manager that his or her approval of the received invoice (which is now stored in the 'invoice image depository' 24) is required, as illustrated by block 26 of FIG. 3. Recall that the 'fax transmission or scan image of the received invoice' (which is stored in the 'invoice image depository' 24) is linked to the 'Lotus Notes of a User/Manager', as illustrated by block 26 of FIG. 3, and that the User/Manager can check his Lotus Notes, periodically, in much the same way that one would check his or her email for any further information. When the link via line 31 in FIG. 3 between the 'approval process' block 34 of the CAAPS system 14 and the 'Link to Lotus Notes' block 26 of the IPASS software 12d1 is initiated and accomplished, since the 'fax transmission or scan image of the received invoice' stored in the 'invoice image depository' 24 is also linked to the 'Lotus Notes of a User/Manager' 26 of FIG. 3, the contractor or buyer's User/Manager will be automatically and periodically reminded, in his or her Lotus Notes, that his or her approval of the 'fax transmission or scan image of the received invoice' which is stored in the invoice image depository 24 is required. That automatic and periodic reminder in the User/Manager's Lotus Notes will continue until the contractor or buyer's User/Manager approves (or disapproves) the 'fax transmission or scan image of the received invoice' which is stored in the invoice image depository 24. When that approval of the invoice is obtained, an indication of that approval will be transmitted back to the 'approval process' block 34 via line 31 in FIG. 3 whereupon a further indication of that approval will be transmitted from the 'approval process' block 34 to the 'invoice image depository' block 24 via line 27 in FIG. 3. As a result, the 'fax transmission or scan image of the received invoice' stored in the invoice image depository 24 will be updated to reflect that approval, that is, the approval of the invoice by the contractor or buyer's User/Manager.

In FIG. 3, now that the 'approval process' 34 in the CAAPS accounts payable system 14 is complete and that a record of that approval is reflected in the 'fax transmission or scan image of the received invoice' stored in the invoice image depository 24, it is now time to pay the amount due, under the invoice, to the subcontractor or supplier. The 'bank paylink' process set forth in block 36 of FIG. 3 will now be initiated. During the 'bank paylink' step 36, a check will be issued from the contractor or buyer to the subcontractor or supplier in an amount equal to the amount set forth on the invoice which is now stored in the invoice image depository 24. When the check is issued to the subcontractor or buyer, a record of that payment is transmitted from the 'bank paylink' block 36 to the invoice image depository 24 via line 29, whereupon that record of payment is recorded on the 'fax transmission or scan image of the received invoice' that is stored in the invoice image depository 24.

In FIGS. 2 and 3, the 'fax transmission or scan image of the received invoice' stored in the invoice image depository 24 will reflect: (1) the approval of the invoice stored in the invoice image depository 24, and (2) the issuance of a check to the subcontractor or buyer in payment of the amount set forth in the invoice stored in the invoice image depository 24. When the subcontractor or supplier, while using the subcontractor or buyer's computer 16 of FIG. 2, accesses the internet 18, accesses the server 12 of FIG. 2, and overcomes the server's firewall 12e in FIGS. 2 and 3 by supplying the subcontractor or supplier's 'userid' and 'number', the subcontractor or supplier can now view the 'fax transmission or scan image of the received invoice' which is now stored in the invoice image depository 24. The invoice stored in the invoice image depository 24 will now indicate that: (1) the invoice has been approved, and (2) payment of the amount set forth in the invoice has been initiated by issuance of a check in the amount stated on the invoice.

In FIG. 3, when the 'fax transmission or scan image of the received invoice', which is stored in the invoice image depository 24, records both an approval of the invoice and a payment of an amount under the invoice, the 'fax transmission or scan image of the received invoice' which is stored in the invoice image depository 24 will now be transferred to final storage in an invoice image archive of a content management database, as illustrated in block 28 of FIG. 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A server computer configured to interface with an accounts payable system and responsive to an image of an invoice for entering data on said invoice into said accounts payable system of a receiver of the invoice, said accounts payable system including a plurality of data fields, an automated update section responsive to received updated data and information, a goods receipt update section responsive to the updated data and information, an approval process section that obtains approvals prior to payment of the invoice, and bank paylink section that issues payment of the invoice, the server computer comprising:

a system that receives said invoice from a sender of the invoice and creates said image of the invoice;

a first storage apparatus responsive to said image of said invoice configured for storing said image of said invoice therein;

a conversion apparatus configured for retrieving said image of said invoice from said first storage apparatus and converting said image into a digitized image, said digitized image including a plurality of data characters placed in selected locations;

a reading apparatus configured for reading the plurality of data characters in said selected locations of said digitized image;

a transferring apparatus configured for transferring the plurality of data characters read from said selected locations of said digitized image into corresponding ones of said plurality of data fields of said accounts payable system; and an apparatus communicating with the approval process section and being configured for recording on said digitized image of said invoice each of:

an indication that the invoice has been approved so that the sender can receive payment via the accounts payable system; and an additional indication that payment of the invoice has been initiated by issuance of a check via the bank paylink section, wherein, after said digitized image of said invoice is recorded with each indication, the server computer allows access via the internet to said digitized image by the sender of the invoice in order to allow the sender of the invoice to view said digitized image of said invoice having the indication of approval of said invoice and the additional indication that payment of said invoice has been initiated.

2. The server computer of claim 1, further comprising:

an invoice image depository apparatus adapted for storing said image of said invoice therein.

3. The server computer of claim 2, further comprising: a firewall operatively interconnected to said invoice image depository adapted for responding to a query from an internet and allowing access by said query to said image of said invoice stored in said invoice image depository when a suitable userid or password or other number is provided by said query.

4. The server computer of claim 3, wherein said invoice image depository records the approval indication in said image of said invoice stored therein when a user or manager approves said invoice for payment.

5. The server computer of claim 4, wherein said invoice image depository records the payment indication in said image of said invoice stored therein when an amount in said invoice is paid.

6. The server computer of claim 5, further comprising: a system for automatically reminding said user or manager to approve said invoice for payment.

7. A method responsive to receipt of an invoice from a sender for entering said invoice into an accounts payable system of a receiver of the invoice and paying an amount on said invoice, wherein the accounts payable system includes an automated update section responsive to received updated data and information, a goods receipt update section responsive to the updated data and information, an approval process section that obtains approvals prior to payment of the invoice, and bank paylink section that issues payment of the invoice, the method comprising the steps of:

receiving or creating an image of said invoice;

after the receiving or creating, converting, by the receiver of the invoice, said image of said invoice into a digitized invoice image which includes a plurality of data characters stored in selected locations;

reading said plurality of data characters from said selected locations of said digitized invoice image and transferring the plurality of data characters read from said selected locations into corresponding data fields of said accounts payable system;

recording on the digitized invoice image of said invoice, using a device communicating with the approval process section, each of an indication of approval of the invoice so that the sender can receive payment via the accounts payable system; and an additional indication of payment of the invoice by issuance of a check via the bank paylink section;

after the recording, paying the sender said amount on said invoice; and after the recording, allowing access via the internet to said digitized invoice image by the sender of the invoice in order to allow the sender of the invoice to view said digitized invoice image of said invoice having the indication of approval of said invoice and the additional indication that payment of said invoice has been initiated.

8. The method of claim 7, further comprising the step of: storing said image of said invoice into an invoice image depository.

9. The method of claim 8, wherein the step of paying said amount on said invoice comprises the steps of:

when said plurality of data characters from said digitized invoice image are transferred into said corresponding data fields of said accounts payable system, waiting for any goods to be received or services to be performed;

automatically reminding a user/manager to approve said invoice in said accounts payable system when said goods are received or said services are performed; and approving, by said user/manager, said invoice in said accounts payable system when said goods are received or said services are performed and the reminding step is practiced.

10. The method of claim 9, wherein the step of paying said amount on said invoice further comprises the steps of:

recording the indication of said approval of said invoice in said invoice image depository when the step of approving said invoice is complete.

11. The method of claim 10, wherein the step of paying said amount on said invoice further comprises the steps of:

paying said amount on said invoice when the step of recording said indication of said approval of said invoice is complete;

recording the indication of said payment of said amount on said invoice in said invoice image depository when the step of paying said amount on said invoice is complete; and storing said image of said invoice in an archive when the step of paying said amount on said invoice and the step of recording said indication of said payment is complete.

12. The method of claim 8, wherein the step of storing said image of said invoice into an invoice image depository comprises the steps of:

storing said image of said invoice into said invoice image depository;

receiving by said invoice image depository a query from an internet and determining if a userid and number supplied by the query is accurate;

allowing access by said query to said image of said invoice stored in said invoice image depository when the userid and number is accurate.

13. The method of claim 11, wherein the step of recording the indication of said payment of said amount on said invoice in said invoice image depository when the step of paying said amount on said invoice is complete comprises the steps of:

recording the indication of said payment of said amount on said invoice in said invoice image depository when the step of paying said amount on said invoice is complete;

receiving by said invoice image depository a query from an interne and determining if a userid and number supplied by the query is accurate; and allowing access by said query to the record of said indication of said approval of said invoice and the record of said indication of said payment of said amount on said invoice in said image of said invoice stored in said invoice image depository when the userid and number is accurate.

14. A program storage device readable by a machine, tangibly embodying a program of instructions executable by the machine, to perform method steps for entering an invoice received from a sender of the invoice into an accounts payable system of a receiver of the invoice to pay an amount on said invoice, wherein the accounts payable system includes an automated update section responsive to received updated data and information, a goods receipt update section responsive to the updated data and information, an approval process section that obtains approvals prior to payment of the invoice, and bank paylink section that issues payment of the invoice, said method steps comprising:

receiving an image of said invoice;

converting, by the receiver of the invoice, said image of said invoice into a digitized invoice image which includes a plurality of data characters stored in selected locations;

reading, by the receiver of the invoice, said plurality of data characters from said selected locations of said digitized invoice image and transferring the plurality of data characters read from said selected locations into corresponding data fields of said accounts payable system, said amount on said invoice being paid when the plurality of data characters from the selected locations of the digitized image are transferred to said corresponding fields of said accounts payable system;

recording, by the receiver of the invoice, on the digitized invoice image of said invoice, using a device communicating with the approval process section, each of:

an indication of approval of the invoice so that the sender can receive payment via the accounts payable system; and an additional indication that payment of the invoice has been initialed by issuance of a check via the bank paylink section; and after the converting, the reading, and the recording, allowing access via the interne to said digitized invoice image by the sender of the invoice in order to allow the sender of the invoice to view said digitized invoice image of said invoice having the indication of approval of said invoice and the additional indication that payment of said invoice has been initiated.

15. The program storage device of claim 14, further comprising the step of storing said image of said invoice into an invoice image depository.

16. The program storage device of claim 15, further comprising the step of: receiving a reminder from an approval process routine of said accounts payable system and, responsive thereto, generating a link to a manager and to said invoice stored in said invoice image depository to remind said manager to approve said invoice stored in said invoice image depository.

17. The program storage device of claim 16, further comprising the step of: recording the indication of approval of said invoice in said invoice image depository when said manager approves said invoice stored in said invoice image depository.

18. The program storage device of claim 17, further comprising the steps of:

receiving the indication of payment of said amount on said invoice stored in said invoice image depository when the step of recording said indication of said approval of said invoice is complete;

recording said indication of said payment of said amount on said invoice in said invoice image depository in response to the step of receiving said indication of payment; and storing said image of said invoice in an archive when said indication of payment is received and said indication of payment is recorded on said invoice in said invoice image depository.

19. The program storage device of claim 15, further comprising the steps of:

receiving by said invoice image depository a query from an internet and determining if a userid and number supplied by the query is accurate;

wherein the allowing access comprises allowing access by said query to said image of said invoice stored in said invoice image depository when the userid and number is accurate.

20. The program storage device of claim 18, further comprising the steps of:

receiving by said invoice image depository a query from an internet and determining if a userid and number supplied by the query is accurate; and wherein the allowing access comprises allowing access by said query to the record of said indication of said approval of said invoice and to the record of said indication of said payment of said amount on said invoice on said image of said invoice stored in said invoice image depository when the userid and number is accurate.

* * * * *